(12) United States Patent
Aman

(10) Patent No.: US 6,435,284 B1
(45) Date of Patent: *Aug. 20, 2002

(54) GARDENING TOOL

(75) Inventor: Wayne Aman, Burnsville, MN (US)

(73) Assignee: Super Test Corporation, Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 08/007,552

(22) Filed: Jan. 22, 1993

(51) Int. Cl.[7] ................................................. A01B 1/00
(52) U.S. Cl. ........................... 172/371; 294/58; 172/372
(58) Field of Search ................................. 172/371–378; 56/400.04, DIG. 18; 294/57, 58; 2/16; 124/20.1; 81/489, 177.1; 16/114 R, 110 R

(56) References Cited

U.S. PATENT DOCUMENTS

| | | | | |
|---|---|---|---|---|
| 407,571 A | * | 7/1889 | Calef .......................... | 294/58 |
| 712,843 A | * | 11/1902 | Paul .......................... | 294/58 |
| 2,482,589 A | * | 9/1949 | Maguire ...................... | 294/58 |
| 2,710,571 A | * | 6/1955 | Pfister ........................ | 172/378 |
| 2,735,417 A | * | 2/1956 | Denekar ..................... | 124/20.1 |
| 4,250,861 A | * | 2/1981 | Ellenberg ................... | 124/20.1 |
| 4,319,642 A | * | 3/1982 | Merz .......................... | 172/371 |
| 4,888,846 A | * | 12/1989 | Natale ......................... | 294/58 |
| 4,922,884 A | * | 5/1990 | Ford .......................... | 124/20.1 |
| 5,123,405 A | * | 6/1992 | McShirley et al. ........... | 128/36 |
| 5,159,775 A | * | 11/1992 | Sutula, Jr. ................... | 294/58 |

* cited by examiner

*Primary Examiner*—Randolph A. Reese
*Assistant Examiner*—Spencer Warnick
(74) *Attorney, Agent, or Firm*—Shook, Hardy & Bacon LLP

(57) ABSTRACT

A gardening tool which consists of a handle grip, a tool head section, an extension rod and a support pad; a section of the extension rod is joined and secured to the handle grip, and since the support pad is actively conjoined with the extension rod to form a contoured, recessed area, the user is provided with a columnar handle to grasp as well as, a firm support for the forearm.

2 Claims, 4 Drawing Sheets

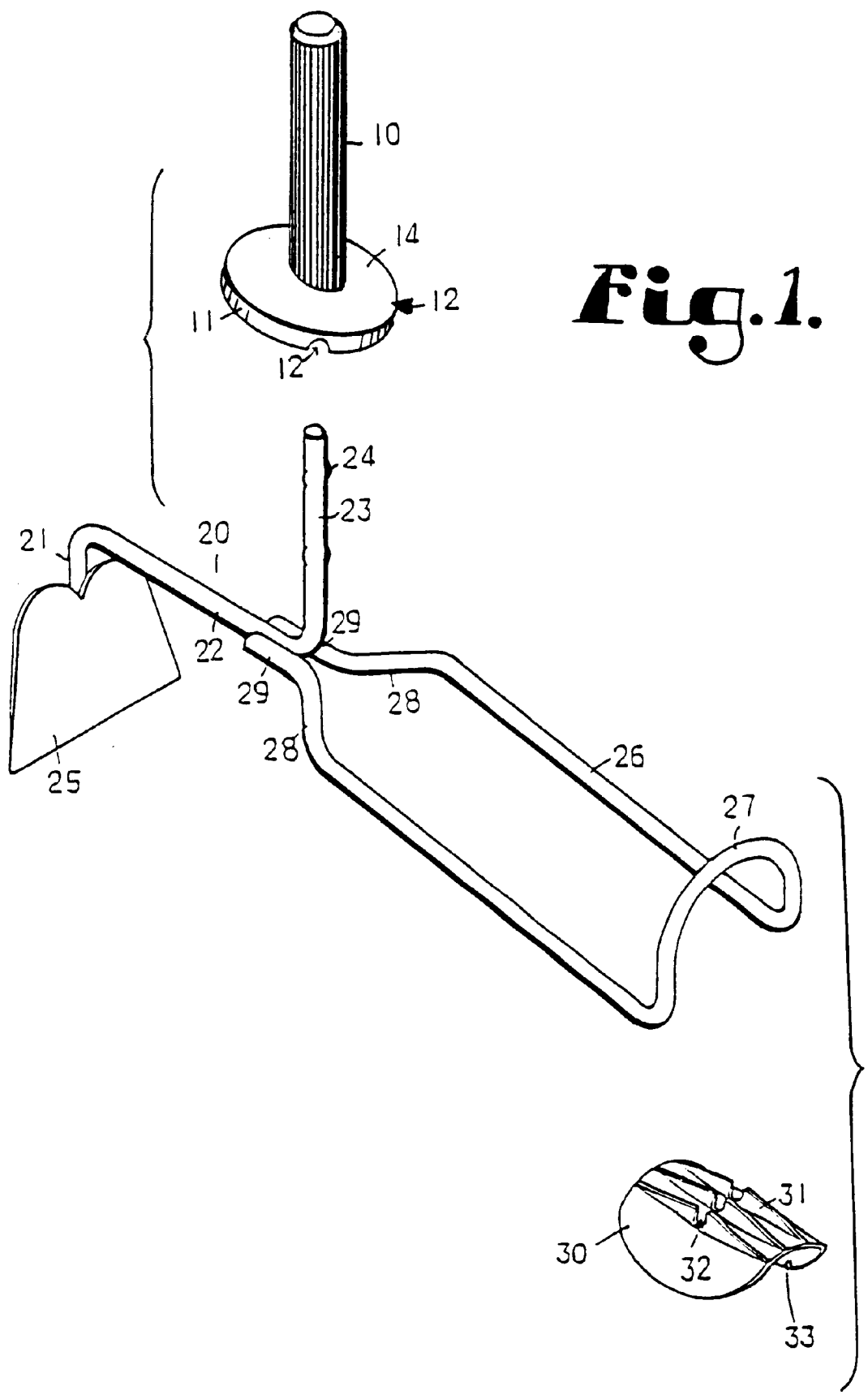

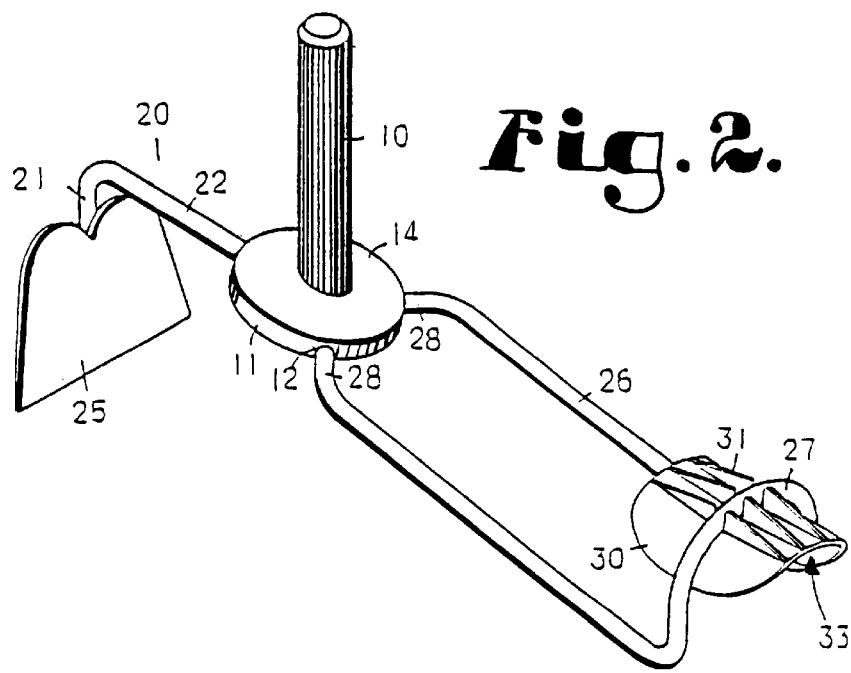
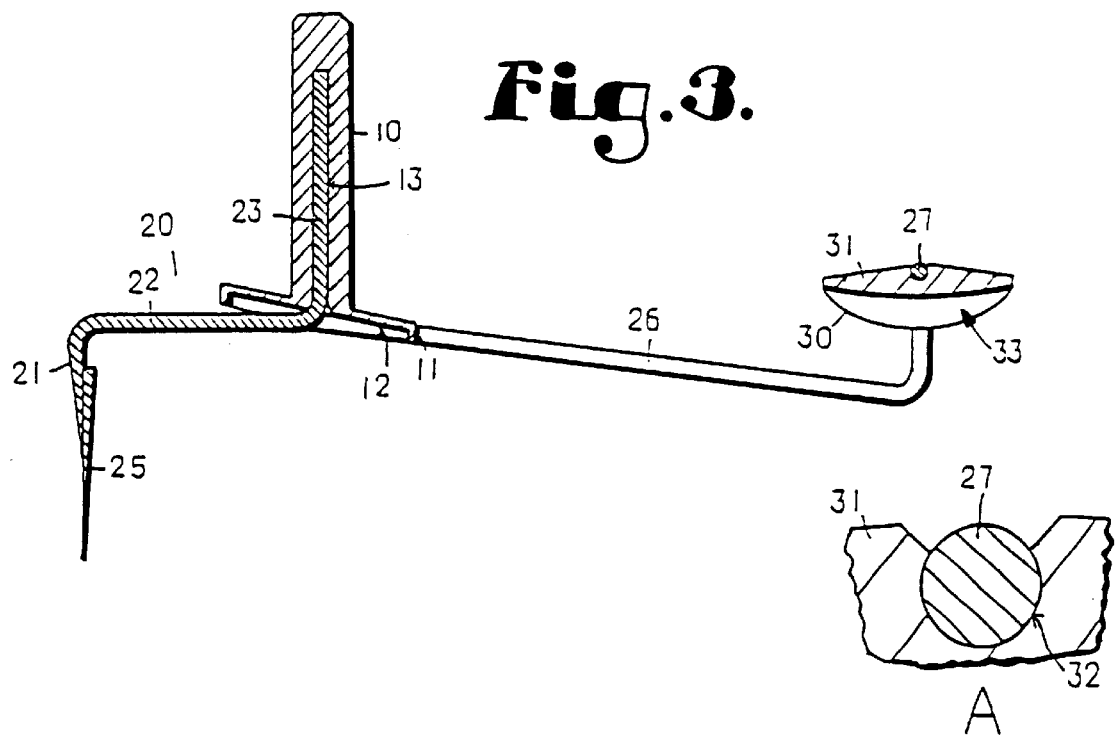

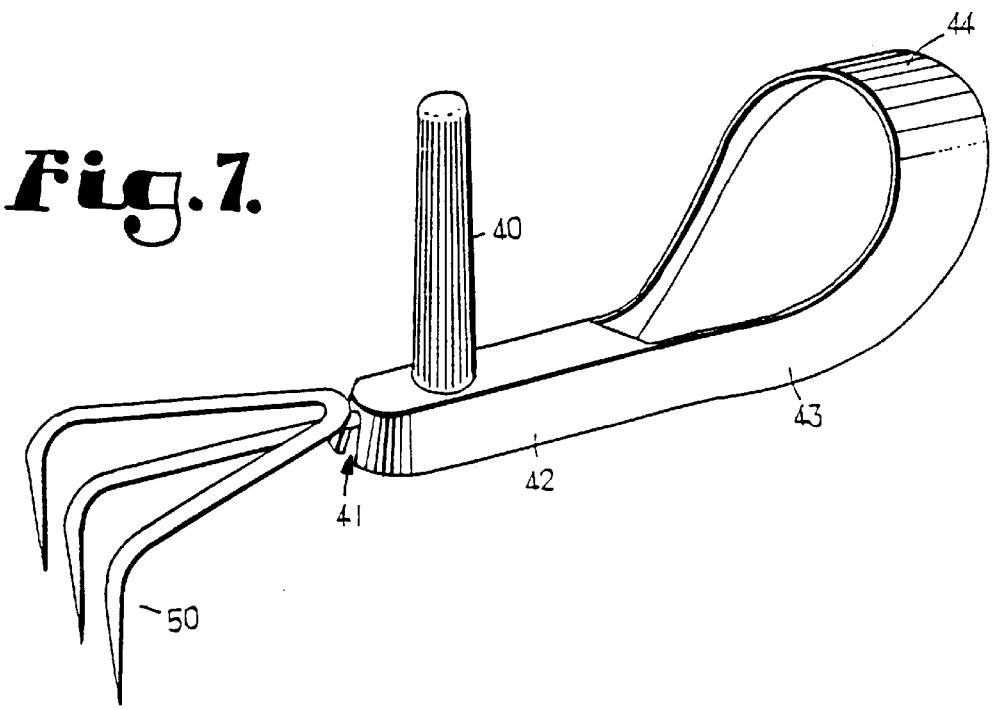
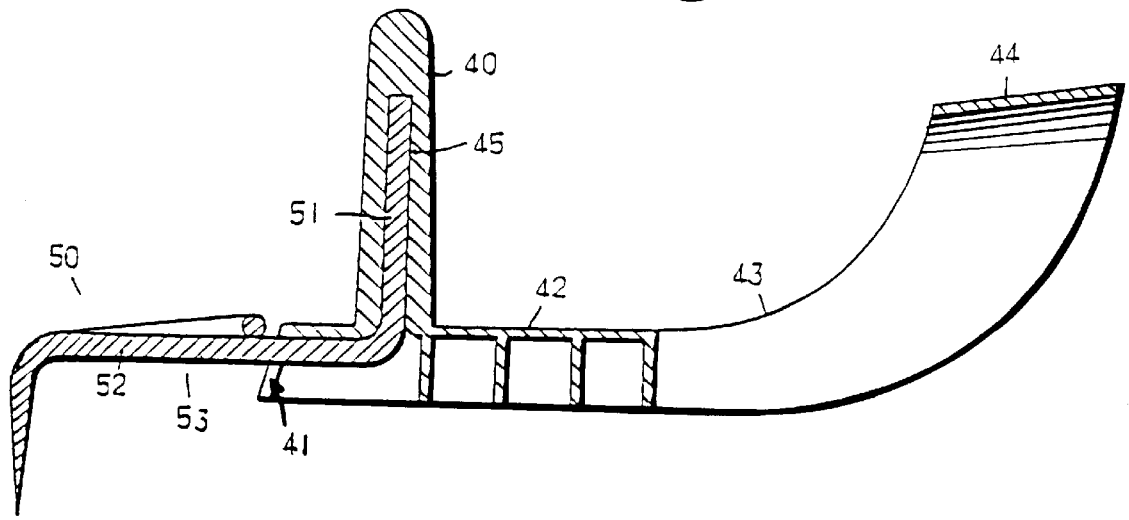

GARDENING TOOL

BACKGROUND OF THE INVENTION

The structural configuration of conventional gardening tools (specifically denoting implements utilized for household gardening) normally consists of a single shaft with a handle at one end and the head of the tool at the opposite end; the aforementioned head is commonly available in several basic forms, including the forked, triangular and trapezoidal. As presently designed and constructed, conventional gardening tools require an inordinately large amount of physical, exertion to manipulate, causes pain and stiffness of the wielding hand and consequently reduces interest in gardening as a leisurely activity.

In view of the aforemention situation, the inventor herein has personally verified the existence of the deficiencies common to conventional gardening tools, undertaken concentrated research to improve the inadequacies through experimentation and finally succeeding in the development of the invention herein. The invention herein offers more efficiency by requiring less manipulative exertion and will increase the interest in gardening as a leisurely activity.

BRIEF DESCRIPTION OF THE DRAWINGS

The following drawings are appended as pictoral references to the structure, assembly and functional application examples of the invention herein, which shall be further elaborated in the detailed description of the invention herein in order to provide evaluation personnel with a comprehensive understanding of the invention herein as well as justify the granting of the patent or patents claimed by the invention herein.

FIG. 1 is an in exploded drawing of the invention herein.

FIG. 2 is an isometric drawing of the invention herein as fully assembled.

FIG. 3 is an orthographic drawing showing the side view of the invention herein and a partial top view (inset A) detailing the relationship of upwardly oriented arch, ribs and notch.

FIG. 7 is an isometric drawing of the invention herein as configured in an alternate design.

FIG. 8 is an orthographic drawing showing the side view of FIG. 7.

DETAILED DESCRIPTION OF THE INVENTION

Figure 5:
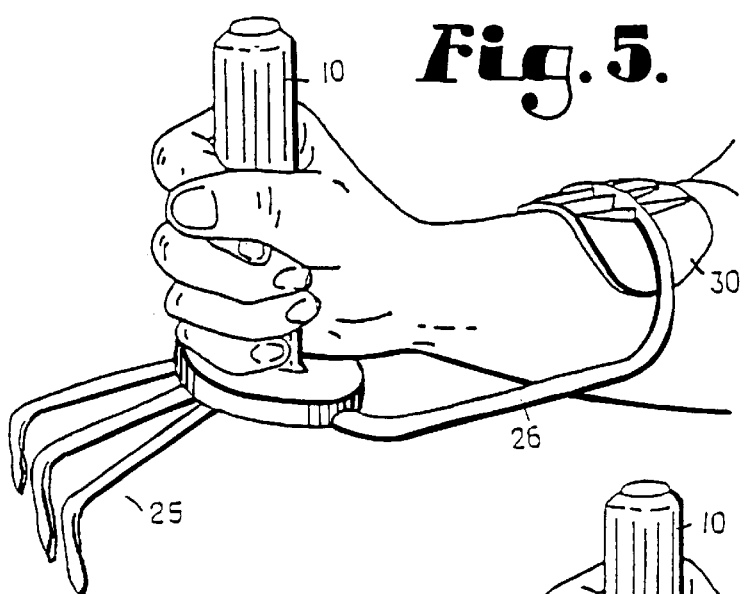
FIG. 5 is an explanatory illustration of the invention herein as equipped with a forked tool head.

As indicated in FIG. 1, the invention herein consists of a handle grip (10), a tool head (25), extension rod (26) and a support pad (30); the aforementioned handle grip (10) has a lower base section (14); a rim (11) is formed along the circumferential vertical edge of the aforementioned lower base section (14) and a semi-circular groove (12) is molded on the underside of the aforementioned lower base section (14), with one end of the aforesaid groove (12) emerging from appropriate side of the aforesaid rim (11); the aforementioned handle grip (10) has a hollow section (13) (see FIG. 3); the trapezoidal tool head (25) is welded to a connecting shaft (20) which has an upwardly oriented vertical section (23) with several protruding tabs (24); the rear end of the horizontal section (22) of the aforementioned connecting shaft (20) is welded to a folded extension rod (26) in between the two forward ends (29) of the aforesaid extension rod (26); the downwardly oriented vertical section (21) of the aforementioned connecting shaft (20) is welded to the aforementioned trapezoidal tool head (25); the aforementioned two forward ends (29) of the aforesaid extension rod (26) are welded on both sides of the, rear end of the aforementioned horizontal section (22), with the structural configuration enabled by neck section (28) in the aforementioned extension rod (26) which suitably accommodates the width of the aforementioned horizontal section (22); formed at the rear end of the aforementioned extension rod (26) is an upwardly orientedarch (27); the aforementioned support pad (30) is contoured in shape and has a number of ribs (31) on the upper surface and, moreover, there is a notch (32) in the mid-section of each of the aforesaid ribs (31); and the underside of the aforementioned support pad (30) consists of a contoured recessed surface (33).

To assemble the invention herein, the upwardly oriented vertical section (23) of the connecting shaft (20) is first inserted into hollow section (13) of the handle grip (10), which is secured to the aforementioned connecting shaft (20) through the interlocking action of the protruding tabs (24) inside the aforementioned hollow section (13) of the aforementioned handle grip (10), and the neck section (28) is enslotted into the semi circular groove (12); secondly, the upwardly oriented arch (27) of the extension rod (26) is inserted into the notches (32) in the ribs (31) and, furthermore, the entry width of the aforesaid notches (32) are designed to be narrower than the overall notch diameter (refer to FIG. 3, inset A) in order to prevent the support pad (30) from slipping off the aforementioned upwardly oriented arch (27); the fully assembled invention herein is shown in FIG. 2.

Figure 4:
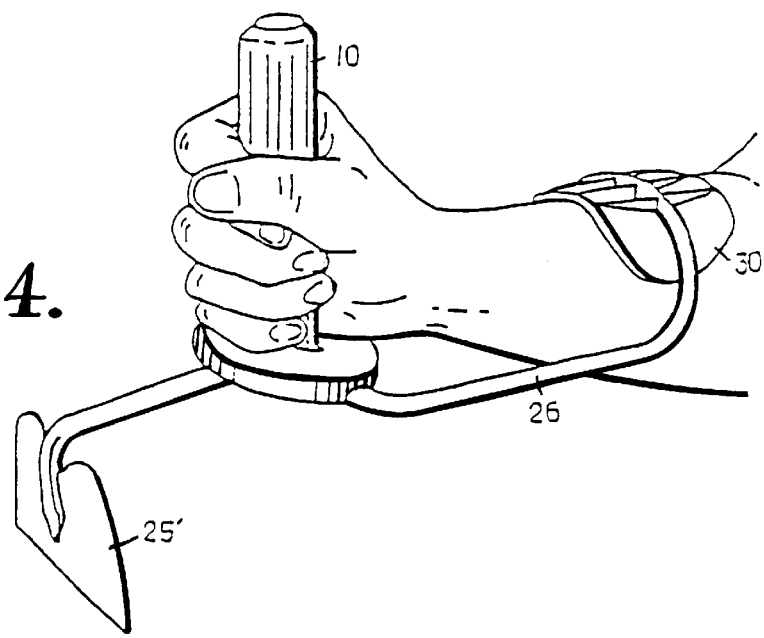
FIG. 4 is an explanatory illustration concerning the application of the invention herein.
Figure 6:
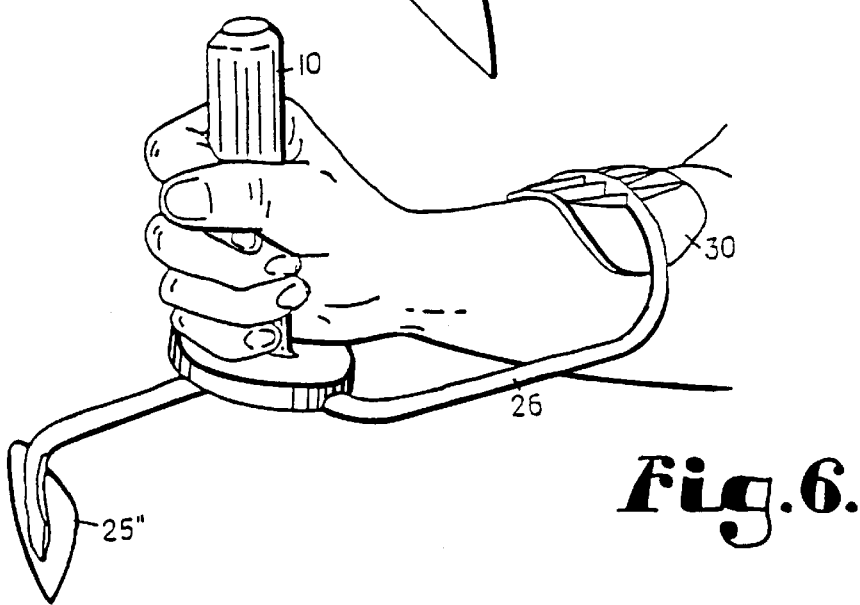
FIG. 6 is an explanatory illustration of the invention herein as equipped with a trangular trowel tool head

A typical application of the invention herein is shown in FIG. 4, wherein the hand and forearm are first placed through the extension rod (26) before the palm grasps the handle grip (10) and, if the forearm is firmly within the contoured recessed surface (33) of the support pad (30), then the aforementioned support pad (30) allows the forearm to act as an additional structural buttress of the invention herein; FIG. 5 and FIG. 6 illustrate fisher applications of the invention herein, namely the invention herein as equipped with forked head tool (25) (FIG. 5) and as equipped with a triangular head tool (25) (FIG. 6).

The unique advantages of the invention herein include the manner in which the handle grip (10) is secured to the extension rod (26) and, furthermore how the support pad (30) is fastened to the aforementioned extension rod (26); in addition, when the invention herein is manually utilized, manipulation is supported at the forearm as well as at the hand, moreover, the aforementioned support pad (30) swivels on the aforementioned extension rod (26) to provide a great range of supported movement; therefore, the invention herein reduces the degree of manual energy required, thereby increasing utilization efficiency and minimizing the possibility of muscular strains and the resultant discomforts thereof.

The invention herein can be configured in an alternate style as depicted by the example in FIG. 7 (FIG. 8). As indicated in FIG. 7 and FIG. 8, the handle grip (40) and the extension rod (43) are integrated into a single unit and, furthermore, the aforementioned extension rod (43), the neck section (42) and the aforementioned handle grip (40) also comprise a single unit; moreover, the aforementioned extension rod (43) is constructed out of a broad flat material with the rear section rising upward and formed into an arched section (44), with a notch (41) machined in the front of the neck section (42); a three-pronged forked head tool (50) is welded to the connecting shaft (53) and the upwardly oriented vertical section (51) is inserted into the hollow section (45) of the aforementioned handle grip (40), thereby enabling the aforesaid handle grip (40) to be integrated with the aforementioned three-pronged forked head tool (50) as a single piece, with the horizontal section (52) of the aforementioned connecting shaft (53) enslotted into the aforementioned notch (41).

With regard to the fundamental conception of the invention herein shown in FIG. 1, FIG. 2, FIG. 3 and FIG. 4 as compared with the secondary conception of invention herein depicted in FIG. 7 and FIG. 8, the essential differences are. that in the fundamental conception of the invention herein, the extension rod (26) is welded to the head tool (25), while in the secondary conception of the invention herein, the extension rod (43) and the handle grip (40) are a single unit (integrated); secondly, in the fundamental conception of the invention herein, the support pad (30) is fastened to the arched section (27) of the extension rod (26), while in the secondary conception of the invention herein, the arched section (44) is integrated with the extension rod (43) and also functions as a support pad; although the aforementioned arched section (44) of the secondary conception of the invention herein is does not swivel, the arched sections (44) (27) of the respective conceptions both provide an effective means of forearm support; therefore, in terms of other structural aspects as well as technique and ingenuity, both the findamental and secondary conceptions of the invention herein are based on an identical innovation.

In summation of the detailed description of the invention herein, the invention herein provides kind of improved gardening tool that offers a vast enhancement of both utility and efficiency, while also complying with the latest invention regulations regarding what constitutes a genuinely new innovation and thus the invention herein is submitted in application for further evaluation pursuant to the granting of the appropriate patent or patents.

What is claimed is:

1. A gardening tool, comprising:

a handle grip constructed and arranged for manual grasping, said handle grip having a longitudinal axis about which said grip is grasped;

an extension rod section extending generally perpendicular to said longitudinal axis and constructed and arranged to extend along the forearm of a user when said handle grip is manually grasped, a forward end of said extension rod section being secured to said handle grip;

a pivot section mounted at a rear end of said extension rod section and constructed and arranged to extend generally across a forearm of a user when said handle grip is manually grasped;

a support pad pivotally mounted upon said pivot section and constructed and arranged to abut against the forearm of the user when said handle grip is manually grasped; and a gardening tool head secured to said handle grip.

2. A gardening tool as in claim 1, wherein said tool head is releasably secured to said handle grip.

* * * * *